United States Patent
Choi et al.

(10) Patent No.: US 7,258,730 B2
(45) Date of Patent: Aug. 21, 2007

(54) AIR PURIFIER

(75) Inventors: Ho Seon Choi, Seoul (KR); In Ho Choi, Gyeonggi-do (KR); Ho Jung Kim, Incheon (KR)

(73) Assignee: LG Electronics Inc., Seoul (KR)

(*) Notice: Subject to any disclaimer, the term of this patent is extended or adjusted under 35 U.S.C. 154(b) by 366 days.

(21) Appl. No.: 11/024,789

(22) Filed: Dec. 30, 2004

(65) Prior Publication Data

US 2006/0005709 A1    Jan. 12, 2006

(30) Foreign Application Priority Data

Jul. 6, 2004    (KR)    .................. 10-2004-0052254

(51) Int. Cl.
*B03C 3/40*    (2006.01)
*B03C 3/62*    (2006.01)

(52) U.S. Cl. .................. 96/69; 95/73; 96/74; 96/94; 96/97; 96/99

(58) Field of Classification Search ............. 96/69, 96/74, 94–100; 95/73, 77; 361/225–235; 422/186.04
See application file for complete search history.

(56) References Cited

U.S. PATENT DOCUMENTS

| | | | | |
|---|---|---|---|---|
| 640,694 | A * | 1/1900 | Otto | 422/186.07 |
| 1,130,212 | A * | 3/1915 | Steere | 95/81 |
| 2,195,431 | A * | 4/1940 | Shively et al. | 422/186.04 |
| 4,216,000 | A * | 8/1980 | Kofoid | 96/80 |
| 4,265,641 | A * | 5/1981 | Natarajan | 95/79 |
| 4,734,105 | A * | 3/1988 | Eliasson et al. | 95/62 |
| 4,874,659 | A * | 10/1989 | Ando et al. | 428/221 |
| 4,944,778 | A * | 7/1990 | Yanagawa | 96/66 |
| 5,055,118 | A * | 10/1991 | Nagoshi et al. | 96/88 |
| 5,084,078 | A * | 1/1992 | Suzuki et al. | 96/52 |
| 5,290,343 | A * | 3/1994 | Morita et al. | 96/39 |
| 5,474,600 | A * | 12/1995 | Volodina et al. | 96/57 |
| 5,707,428 | A * | 1/1998 | Feldman et al. | 96/54 |
| 5,733,360 | A * | 3/1998 | Feldman et al. | 95/78 |
| 6,004,375 | A * | 12/1999 | Gutsch et al. | 95/57 |
| 6,312,507 | B1 * | 11/2001 | Taylor et al. | 96/19 |
| 6,375,714 | B1 * | 4/2002 | Rump et al. | 95/3 |
| 6,635,106 | B2 * | 10/2003 | Katou et al. | 96/67 |
| 6,858,064 | B2 * | 2/2005 | Bologa et al. | 95/65 |
| 2004/0145853 | A1 * | 7/2004 | Sekoguchi et al. | 361/225 |
| 2006/0070526 | A1 * | 4/2006 | Hong et al. | 96/69 |

FOREIGN PATENT DOCUMENTS

JP    5-154409 A *   6/1993   ........... 96/97

* cited by examiner

*Primary Examiner*—Richard L. Chiesa
(74) *Attorney, Agent, or Firm*—Birch, Stewart, Kolasch & Birch, LLP

(57) ABSTRACT

Disclosed is an air purifier with a small size, having an excellent air purifying capacity, capable of preventing a large amount of ozone from being generated, the ozone harmful to a human body. The air purifier includes a case, a pair of discharge electrodes provided at upper and lower parts of the case, a ground electrode provided between the pair of discharge electrodes, a pair of insulating dielectric layers provided on upper and lower surfaces of the ground electrode, and a power source coupled respectively to the ground electrode and the discharge electrode so as to supply voltage thereto.

20 Claims, 5 Drawing Sheets

AIR PURIFIER

CROSS-REFERENCE TO RELATED APPLICATIONS

This application claims the benefit of Korean Application No. P2004-52254, filed on Jul. 6, 2004, which is hereby incorporated by reference as if fully set forth herein.

BACKGROUND OF THE INVENTION

1. Field of the Invention

The present invention relates to an air purifier, and more particularly, to an air purifier having an excellent air purifying function, although the size of which is small, and preventing a large amount of ozone which is harmful to a human body from being generated.

2. Discussion of the Related Art

In general, an air purifier removing dust and bad smell for a pleasant atmosphere is widely used in a living room of a general home, interior of a car, and such places many people gathers as restaurants, hospitals, and offices.

The air purifier is usually used independently. It is however a trend that the air purifier is used as a supplementary device mounted to home appliances such as an air conditioner. In other words, recently, many home appliances having not only cooling/heating and ventilating functions but also air purifying function have been manufactured.

FIG. 1 illustrates a diagram schematically showing a related art air purifier, and FIG. 2 illustrates a diagram showing a corona discharge generated from the related art air purifier. Referring to FIG. 1, the related art air purifier includes a case 10 having opened top and bottom surfaces, a plurality of ground electrodes 20 and a plurality of discharge electrodes 30 provided in the case 10.

The plurality of ground electrodes 20 are spaced apart a predetermined distance from each other in the case. One of the discharge electrodes 30 is provided between every other consecutive ground electrodes 20. In this case, each ground electrode 20 includes a rectangular plate, and each discharge electrode 30 includes a round wire.

The discharge electrode 30 and the ground electrode 20 are spaced apart a predetermined interval from each other, the predetermined distance being more than a common number cm, and respectively coupled with a power source 50 (Refer to FIG. 2) for supplying a high voltage. On upper and lower surfaces of the case 10, a net 40 is provided for preventing large impurities from being entered into the case 10.

An operating principle of the related art air purifier structured as above-mentioned will be briefly described as follows. Referring to FIG. 2, when a voltage is supplied by the power source to the ground electrode 20 the discharge electrode 30, a corona discharge for ionizing surrounding air is generated between the ground electrode 20 the discharge electrode 30.

Due to the corona discharge, anions and ozone separating contaminants contained in air and sterilizing germs are generated around the electrode. Accordingly, the air entered into the air purifier is purified by the anions and ozone.

Meanwhile, the corona discharge is generated when a high voltage of more than 5 KV is supplied to the ground electrode 20 and the discharge electrode 30. In this case, a voltage generating the corona discharge is called an onset discharge, and the onset discharge is different depending on an interval between the discharge electrode 30 and the ground electrode 20.

The related art air purifier in accordance with the related art has following problems. First, since the air purifier in accordance with the related art has a plurality of discharge electrodes and ground electrodes, there is a limitation in miniaturizing it. Particularly, when an air purifier is provided in a home appliance, there is a problem that the whole size of the home appliance is increased.

Second, the related art air purifier generates a plurality of ozone during the corona generation. The higher a voltage supplied to an electrode is, the more amount of ozone is generated. Ozone being a strong acid substance, performs a role of disassembling organic matters in air, but is harmless to a human body.

Therefore, there is a problem that the related art air purifier demands a post-cleaning process for removing ozone generated after the corona discharge.

SUMMARY OF THE INVENTION

Accordingly, the present invention is directed to an air purifier that substantially obviates one or more problems due to limitations and disadvantages of the related art.

An object of the present invention is to provide an air purifier with a small size, having an excellent air purifying capacity, capable of preventing a large amount of ozone from being generated, the ozone harmful to a human body.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an air purifier includes a case; a pair of discharge electrodes provided at upper and lower parts of the case; a ground electrode provided between the pair of discharge electrodes; a pair of insulating dielectric layers provided on upper and lower surfaces of the ground electrode; and a power source coupled respectively to the ground electrode and the discharge electrode so as to supply voltage thereto.

The discharge electrode is provided with at least one discharge tip elongated toward the ground electrode. In this case, it is desirable that the discharge tip and the discharge electrode are formed as a single body.

The power source supplies a high frequency alternating voltage to the discharge electrode and the ground electrode. The discharge electrode is provided with at least one discharge tip elongated toward the ground electrode, and the discharge tip is spaced from the insulating dielectric layer by a predetermined gap for discharge.

In this case, it is desirable that the gap is changed according to voltage frequency, and the discharge electrode is vertically movable.

Meanwhile, the case is divided into a plurality of spaces by a partition, each space having the discharge electrode and the ground electrode provided therein, and the insulating dielectric layer comprises a ceramic.

In another aspect of the present invention, an air conditioner comprising a cabinet; an inlet formed on a front surface of the cabinet; a fan for drawing in room air through the inlet into the cabinet; an interior heat exchanger for exchanging heat between room air flowed into the cabinet and the interior air thereof; a case provided in the cabinet; a pair of discharge electrodes provided to face each other at upper and lower parts of the case; a ground electrode provided between the discharge electrodes; a pair of insulating dielectric layers provided at upper and lower surfaces of the ground electrode; and a power source coupled respectively with the ground electrode and the discharge electrode so as to supply voltage. In this case, the case is provided at the inlet 12, and the case is provided to be parallel to a flow direction of room air flowed thereinto through the inlet.

The discharge electrode comprises at least one discharge tip elongated toward the ground electrode, and the discharge tip and the discharge electrode are formed as a single body.

The power source supplies a high frequency alternating voltage to the discharge electrode and the ground electrode. The discharge electrode is provided with at least one discharge tip elongated toward the ground electrode, and the discharge tip is maintained at predetermined distance from the insulating dielectric layer so as to discharge.

In this case, the gap is changed according to voltage frequency supplied by the power source. Meanwhile, the discharge electrode is vertically movable. The case is divided into a plurality of spaces by a partition, each space respectively having the discharge electrode and the ground electrode therein, and the insulating dielectric layer comprises a ceramic.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
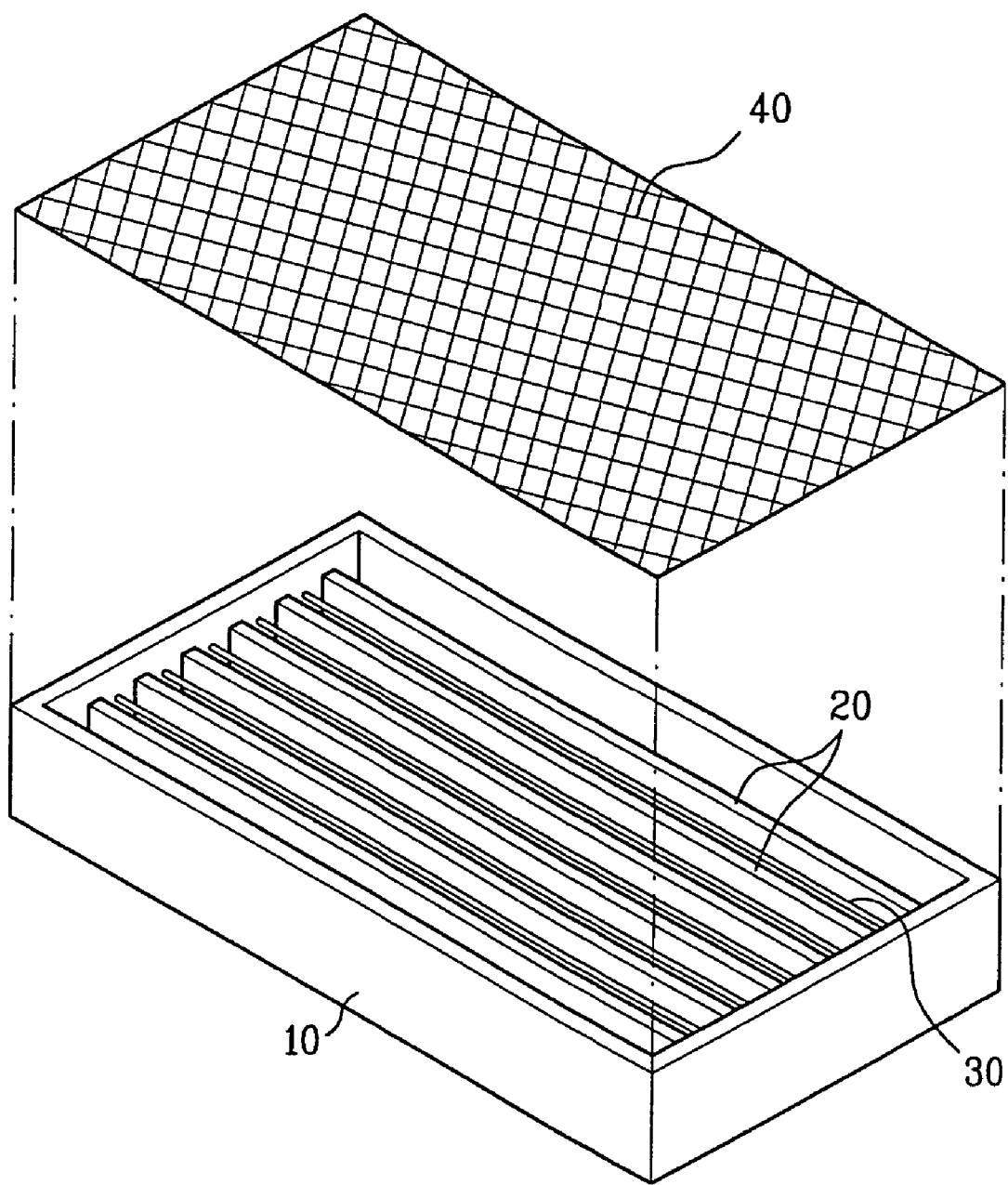
FIG. 1 illustrates a diagram schematically showing a related art air purifier.
Figure 2:
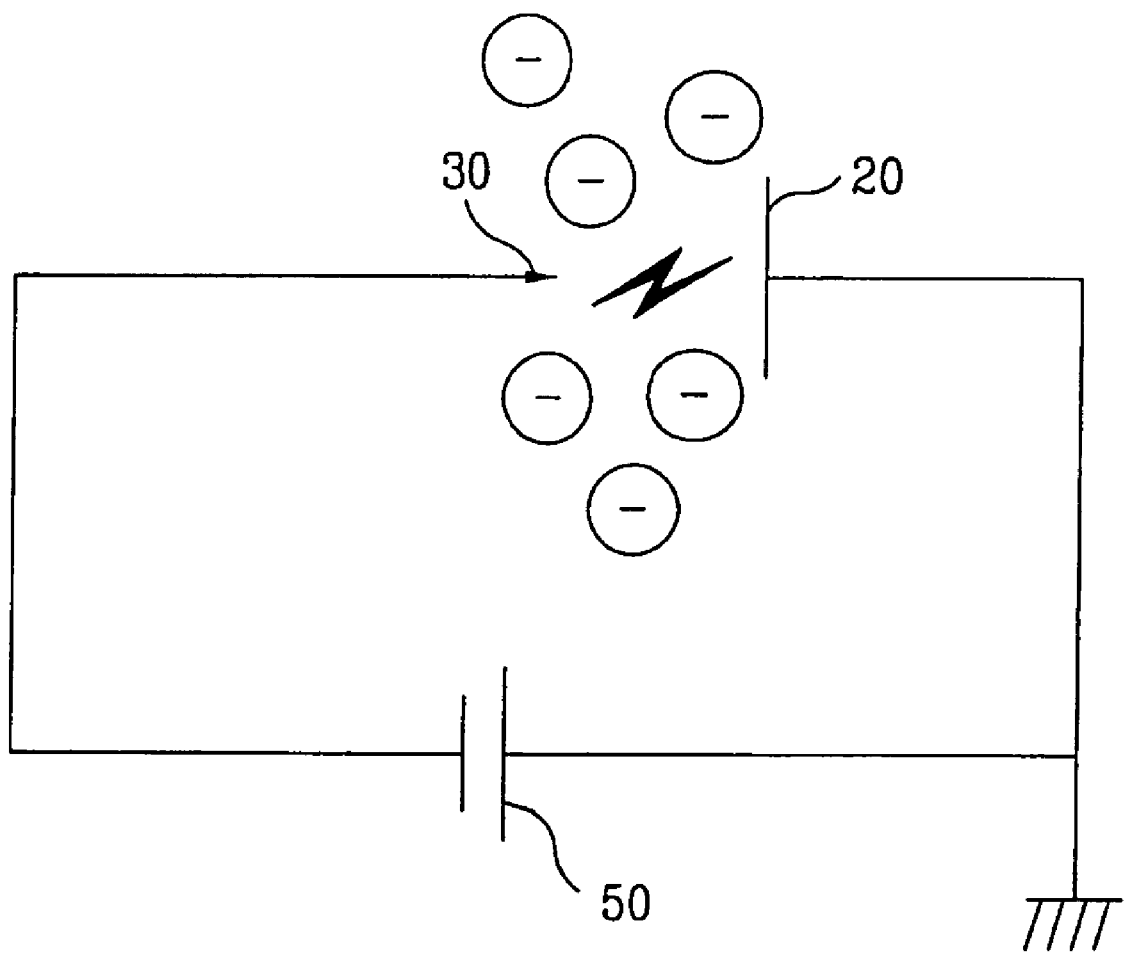
FIG. 2 illustrates a diagram showing a corona discharge generated from the related art air purifier.
Figure 3:
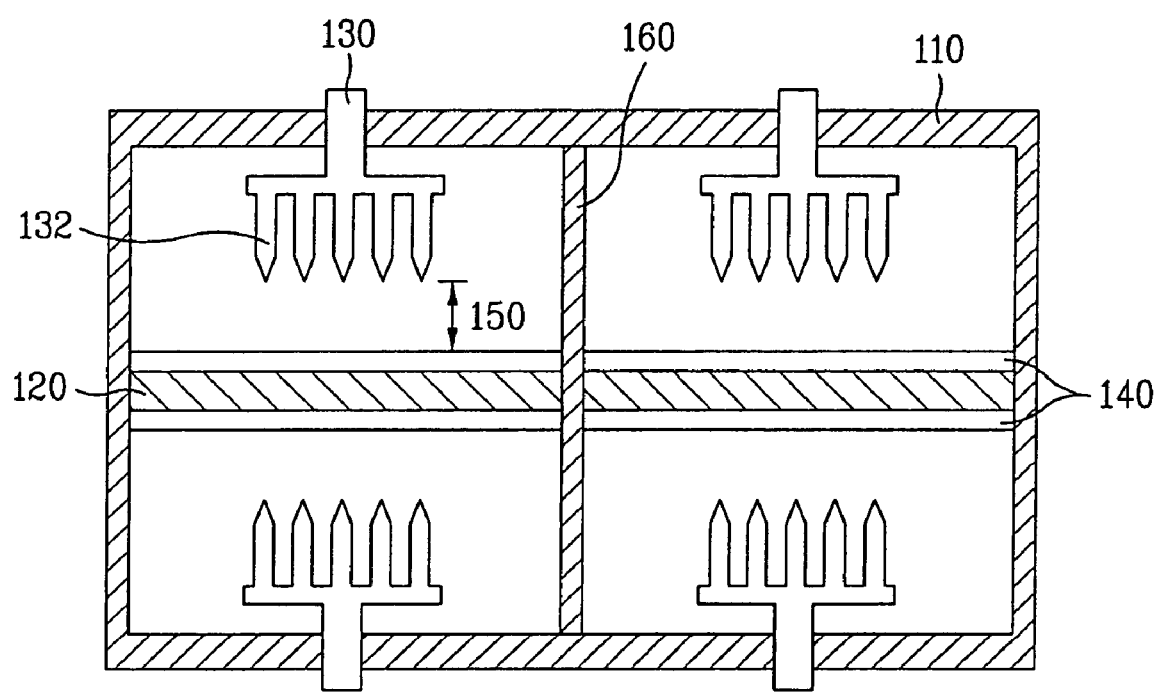
FIG. 3 illustrates a diagram showing a front side of an air purifier in accordance with the present invention.
Figure 4:
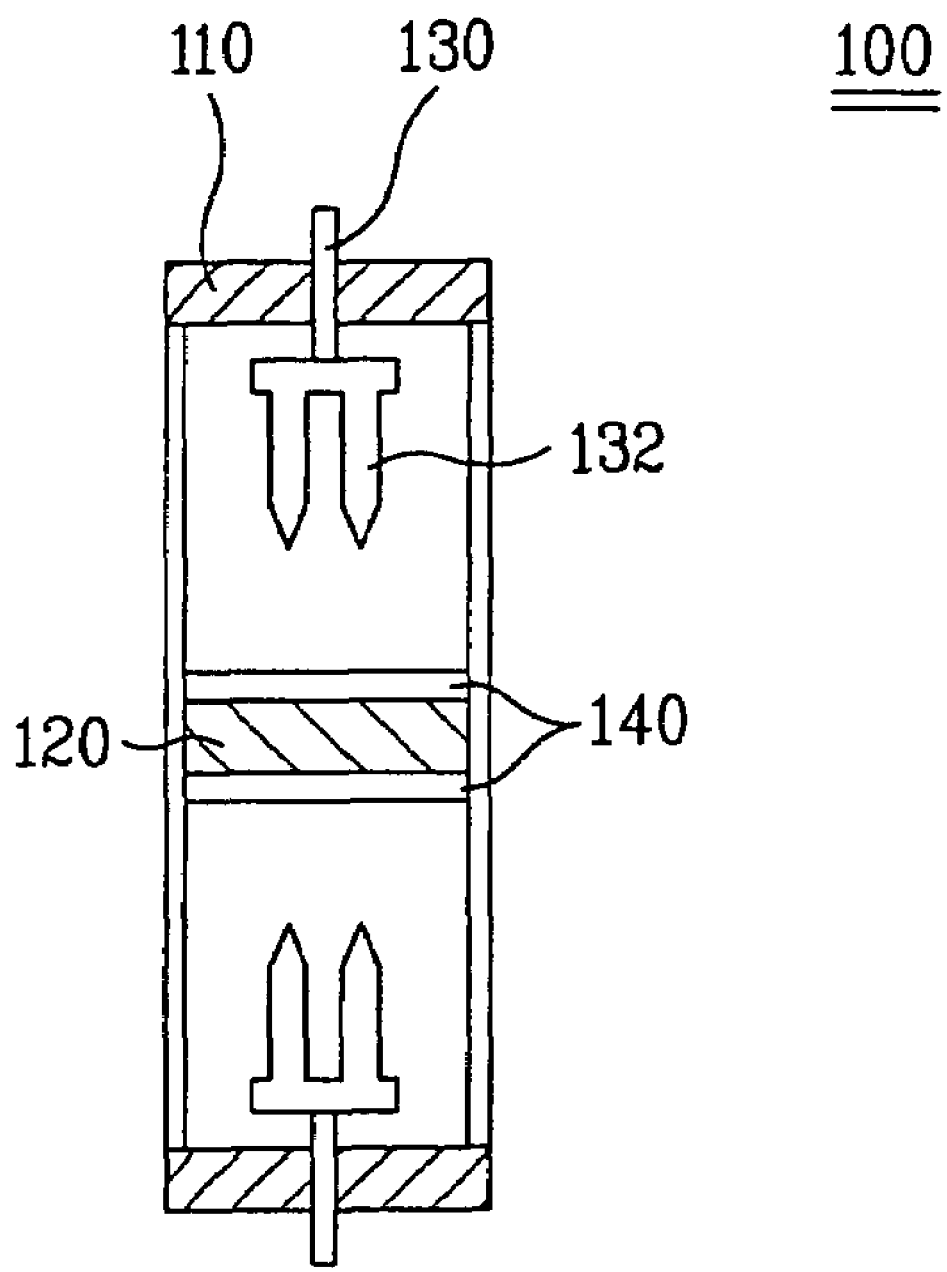
FIG. 4 illustrates a diagram showing a side of the air purifier in accordance with the present invention.

FIG. 3 illustrates a diagram showing a front side of an air purifier in accordance with the present invention, and FIG. 4 illustrates a diagram showing a side of the air purifier in accordance with the present invention. Referring to FIGS. 3 and 4, the air purifier in accordance with the present invention includes a case 110, a pair of discharge electrodes 130 and a ground electrode 120 provided in the case 110, a pair of insulating dielectric layers 140, and a power source (not shown) coupled respectively with the discharge electrode 130 and the ground electrode 140.

The discharge electrodes 130 is provided at an upper part and a lower part of the case 110 to face each other, and the ground electrode 120 is provided between the discharge electrode 130. In this case, the ground electrode 120 is formed in a rectangular plate form.

The pair of insulating dielectric layers 140 are provided on upper and lower surfaces of the ground electrode 120. In other words, contrary to the conventional corona discharge, the pair of insulating dielectric layers 140 are provided between the discharge electrode 130 and the ground electrode 120.

Such structure allows a glow discharge to generate consistently between the discharge electrode 130 and the ground electrode 120. Although it is desirable that the insulating dielectric layer is made of ceramic, it is not essential.

The power source supplies an alternating voltage to the discharge electrode 130 and the ground electrode 120. In this instance, it is desirable that the power source supplies a high frequency alternating voltage to the discharge electrode 130 and the ground electrode 120 because the higher frequency of the alternating voltage is, the easier the discharge is generated at the electrode.

Meanwhile, at least one discharge tip 132 elongated toward the ground electrode 120 is provided at the discharge electrode 130. The discharge tip 132, which is centered by electric charges when the voltage is supplied to the discharge electrode 130, performs a role of decreasing the onset voltage for discharge. It is desirable that the discharge tip 132 and the discharge electrode 130 are formed as a single body.

The discharge tip 132 is spaced apart a predetermined distance from the insulating dielectric layer 140. In other words, the discharge tip 132 maintains a predetermined gap from the insulating dielectric layer 140 so as to discharge.

In this case, it is desirable that the gap 150 is changed according to the frequency of the voltage supplied by the power source. For example, when the frequency of the voltage is higher than 1 kHz, the gap is less than 2 mm. The discharge electrode 130 is provided to be rotatable up and down for controlling the gap 150 according to the frequency change of the voltage.

In the mean time, interior of the case 100 is divided into a plurality of spaces by a partition 160. The discharge electrode 130 and the ground electrode 120 are separately provided in each of the spaces. Such structure allows a large amount of anions, OH Radical, and Ultraviolet rays are generated, enabling a large amount of air is purified in a short period of time.

An operating process of the air purifier 100 in accordance with the present invention will be described as follows. First, when the power source supplies a voltage larger than the onset voltage to the discharge electrode 130 and the ground electrode 120, the insulation between the discharge electrode 130 and the ground electrode 120 is broken, thus the discharge is generated.

In this case, compared to the conventional corona discharge, the onset voltage is remarkably lowered by the discharge tip 132 formed at the discharge electrode 130 as aforementioned. When the voltage is supplied respectively to the electrodes, an electric charge is built up at the insulating dielectric layer 140, and the glow discharge is consistently generated between the discharge electrode 130 and the ground electrode 120 by the built up electric charge.

In the mean time, once the discharge is started, an electrode with negative electricity is discharged from the discharge electrode 130 toward a space between the discharge electrode 130 and the insulating dielectric layer 140, and the electrode discharged from the discharge electrode 130 bumps into gas molecule, thereby generating anions, OH radical, and ultraviolet rays. The anions, OH radical, and ultraviolet rays purify air by oxidizing and disassembling contaminants contained in air.

Meanwhile, the air purifier in accordance with the present invention as aforementioned is provided in a home appliance such as an air conditioner, and used.

Figure 5:
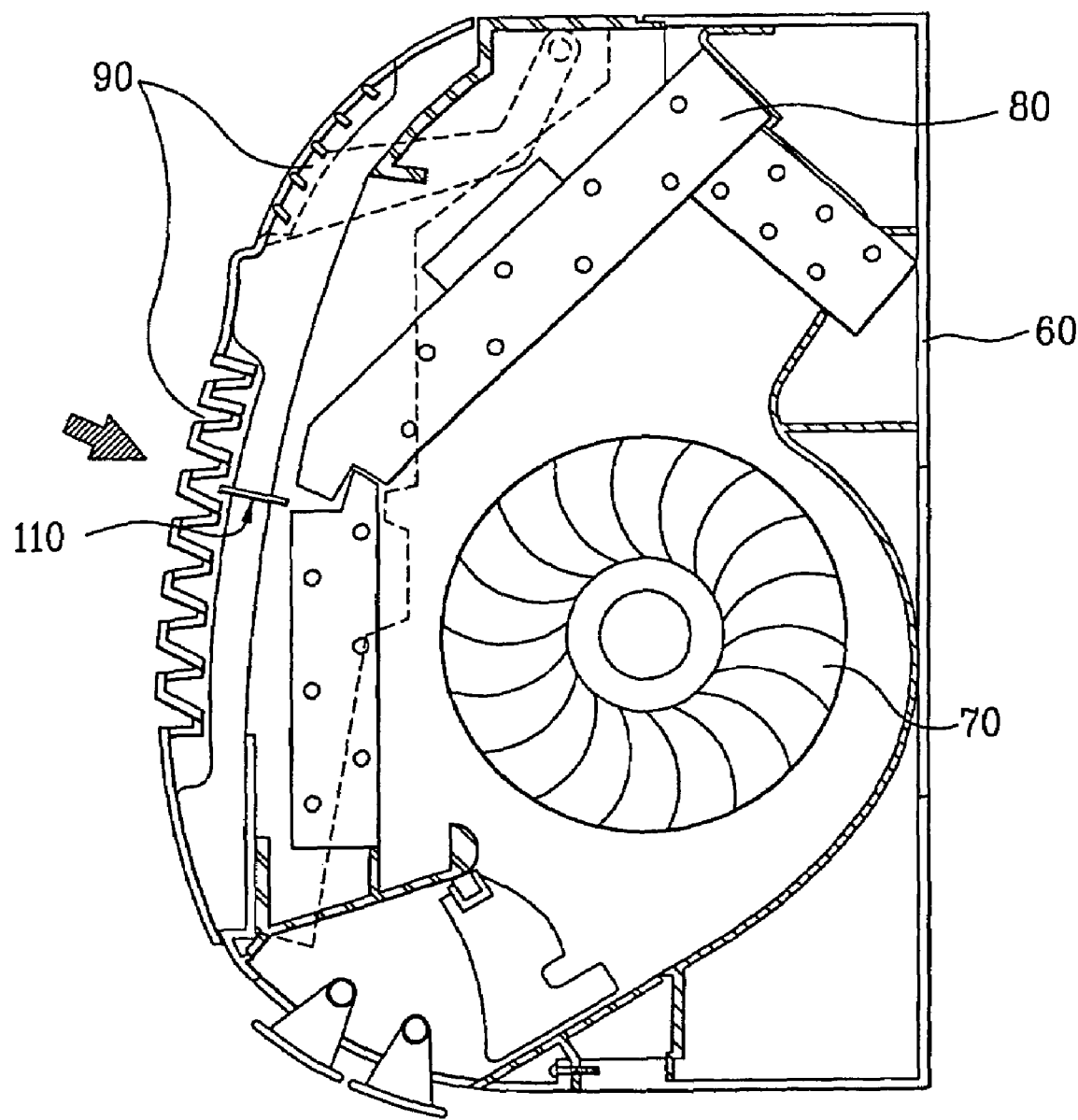
FIG. 5 illustrates a diagram showing an air conditioner having the air purifier in accordance with the present invention.

FIG. 5 illustrates a diagram showing an air conditioner having the air purifier in accordance with the present invention. Referring to FIG. 5, the air purifier includes a cabinet 60, a fan 70, an interior heat exchanger 80, and an air purifier 100. An inlet 90 is formed on a front surface of the cabinet 60, and the fan 70 draws in room air through the inlet 90 into the cabinet 60. The interior heat exchanger 80 exchanges heat between interior air and the room air drawn into the cabinet 60.

As aforementioned, the air purifier 100 includes a case 110, a plurality of discharge electrodes 130 and a plurality of ground electrodes 120, and a plurality of insulating dielectric layers 140. In this case, it is desirable that the case 110 is provided at the inlet 90. When the case 110 is provided at the inlet 90, contaminants are prevented from being stuck on the interior heat exchanger 80 or the fan 70 by purifying room air flowed into the cabinet 60. It is desirable that the case 110 is provided to be parallel to room air flowed through the inlet 90 so as to prevent the room airflow from being interfered by the case 110.

The air conditioner purifies air flowed into the cabinet 60 through the inlet 90 by using the air purifier 100. The air purifier 100 may be provided at various home appliances such as not only the air purifier but also a ventilating system. The air purifier in accordance with the present invention has following effects.

First, the air purifier in accordance with the present invention obtains a consistent glow discharge by using a charge built-up phenomenon of an insulating dielectric layer. Accordingly, a large amount of anions and OH radicals are obtained compared to a related art, and thus excellent sterilization and purification effects are obtained.

Second, since the air purifier in accordance with the present invention has an onset voltage lower than a related art corona discharge, the size of a power source for supplying a voltage can be reduced. Therefore, the air purifier in accordance with the present invention can be easily provided in the home appliances such as the air conditioner.

Also, since the onset voltage is low, a large amount of ozone is prevented from being generated. Accordingly, a post-cleaning process for cleaning the ozone is not required, and a manufacturing process and parts for the ozone cleaning process is not required as well. Therefore, size and manufacturing cost of the air purifier are lowered.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An air purifier comprising:
   a case;
   a pair of discharge electrodes provided at upper and lower parts of the case;
   a ground electrode provided between the pair of discharge electrodes;
   a pair of insulating dielectric layers provided on upper and lower surfaces of the ground electrode; and
   a power source coupled respectively to the ground electrode and the discharge electrode so as to supply voltage thereto.

2. The air purifier of claim 1, wherein the discharge electrode is provided with at least one discharge tip elongated toward the ground electrode.

3. The air purifier of claim 2, wherein the discharge tip and the discharge electrode are formed as a single body.

4. The air purifier of claim 1, wherein the power source supplies a high frequency alternating voltage to the discharge electrode and the ground electrode.

5. The air purifier of claim 4, wherein the discharge electrode is provided with at least one discharge tip elongated toward the ground electrode, and the discharge tip is spaced from the insulating dielectric layer by a predetermined gap for discharge.

6. The air purifier of claim 5, wherein the gap is changed according to voltage frequency.

7. The air purifier of claim 5, wherein the discharge electrode is vertically movable.

8. The air purifier of claim 1, wherein the case is divided into a plurality of spaces by a partition, each space having the discharge electrode and the ground electrode provided therein.

9. The air purifier of claim 1, wherein the insulating dielectric layer comprises a ceramic.

10. An air conditioner comprising:
    a cabinet;
    an inlet formed on a front surface of the cabinet;
    a fan for drawing in room air through the inlet into the cabinet;
    an interior heat exchanger for exchanging heat between room air flowed into the cabinet and the interior air thereof;
    a case provided in the cabinet;
    a pair of discharge electrodes provided to face each other at upper and lower parts of the case;
    a ground electrode provided between the discharge electrodes;
    a pair of insulating dielectric layers provided at upper and lower surfaces of the ground electrode; and
    a power source coupled respectively with the ground electrode and the discharge electrode so as to supply voltage.

11. The air conditioner of claim 10, wherein the case is provided at the inlet.

12. The air conditioner of claim 11, wherein the case is provided to be parallel to a flow direction of room air flowed thereinto through the inlet.

13. The air conditioner of claim 10, wherein the discharge electrode comprises at least one discharge tip elongated toward the ground electrode.

14. The air conditioner of claim 13, wherein the discharge tip and the discharge electrode are formed as a single body.

15. The air conditioner of claim 10, wherein the power source supplies a high frequency alternating voltage to the discharge electrode and the ground electrode.

16. The air conditioner of claim 15, wherein the discharge electrode is provided with at least one discharge tip elongated toward the ground electrode, and the discharge tip is maintained at predetermined distance from the insulating dielectric layer so as to discharge.

17. The air conditioner of claim 16, wherein the gap is changed according to voltage frequency supplied by the power source.

18. The air conditioner of claim 16, wherein the discharge electrode is vertically movable.

19. The air conditioner of claim 10, wherein the case is divided into a plurality of spaces by a partition, each space respectively having the discharge electrode and the ground electrode therein.

20. The air conditioner of claim 10, wherein the insulating dielectric layer comprises a ceramic.

* * * * *